(12) United States Patent
Smets et al.

(10) Patent No.: US 7,520,435 B2
(45) Date of Patent: Apr. 21, 2009

(54) CONTACTLESS PAYMENT CARD READER WITH A FRUSTO-CONICAL OPERATING VOLUME

(75) Inventors: Patrick Smets, Nijlen (BE); Eddy Lodewijk Hortensia Van De Velde, Leuven (BE); Duncan Garrett, London (GB)

(73) Assignee: MasterCard International Incorporated, Purchase, NY (US)

( * ) Notice: Subject to any disclaimer, the term of this patent is extended or adjusted under 35 U.S.C. 154(b) by 569 days.

(21) Appl. No.: 11/182,356

(22) Filed: Jul. 15, 2005

(65) Prior Publication Data

US 2006/0022043 A1    Feb. 2, 2006

Related U.S. Application Data

(60) Provisional application No. 60/588,270, filed on Jul. 15, 2004.

(51) Int. Cl.
    *G06K 7/00* (2006.01)
(52) U.S. Cl. .................. 235/486; 235/380; 235/450
(58) Field of Classification Search ............ 235/451, 235/492, 380, 384, 439, 493, 375, 382, 487, 235/450; 705/41, 53, 67, 64
    See application file for complete search history.

(56) References Cited

U.S. PATENT DOCUMENTS

| 4,066,873 | A | 1/1978 | Schatz ................... 235/487 |
| 4,697,073 | A | 9/1987 | Hara ..................... 235/487 |
| 5,225,977 | A | 7/1993 | Hooper et al. .......... 364/401 |
| 5,466,919 | A | 11/1995 | Hovakimian .......... 235/380 |
| 5,511,114 | A | 4/1996 | Stimson et al. ......... 379/114 |
| 5,623,552 | A | 4/1997 | Lane ..................... 382/124 |
| 5,748,737 | A | 5/1998 | Daggar .................. 380/24 |
| 5,808,558 | A | 9/1998 | Meek et al. |
| 5,880,452 | A | 3/1999 | Plesko ................... 235/472 |
| 6,010,074 | A | 1/2000 | Kelly et al. |
| 6,028,920 | A | 2/2000 | Carson .................. 379/114 |
| 6,112,981 | A | 9/2000 | McCall .................. 235/380 |
| 6,119,940 | A | 9/2000 | Klug |
| 6,240,515 | B1 | 5/2001 | Carnegie et al. |
| 6,315,195 | B1 | 11/2001 | Ramachandran ....... 235/380 |
| 6,318,633 | B1 | 11/2001 | Drexler ................. 235/454 |
| 6,369,719 | B1 | 4/2002 | Tracy et al. |

(Continued)

FOREIGN PATENT DOCUMENTS

EP       1460592       8/2004

(Continued)

OTHER PUBLICATIONS

Contactless Material (WG8); SmartCard Secure Operating System at www.jayacard.org; 3 pages; www.14443.org—Contactless_Documentation.

*Primary Examiner*—Edwyn Labaze
(74) *Attorney, Agent, or Firm*—Baker Botts L.L.P.

(57) ABSTRACT

A contactless payment card reader has a frusto-conical operating volume. The frusto-conical shaped operating volume has defined magnetic field strengths for powering and communicating with proximity payment cards. The reader can serve as a reference reader, which is representative of product readers deployed in contactless payment card systems, to test product contactless payment cards under conditions that simulate field use of the cards.

11 Claims, 3 Drawing Sheets

U.S. PATENT DOCUMENTS

| | | |
|---|---|---|
| 6,394,346 B1 | 5/2002 | Bonneau, Jr. et al. |
| 6,577,229 B1 | 6/2003 | Bonneau et al. |
| 7,046,146 B2 * | 5/2006 | Wuidart et al. ............ 340/572.1 |
| 2001/0001856 A1 | 5/2001 | Gould et al. .................. 705/39 |
| 2001/0024157 A1 | 9/2001 | Hansmann et al. |
| 2001/0034565 A1 | 10/2001 | Leatherman |
| 2002/0046116 A1 | 4/2002 | Hohle et al. .................. 705/14 |
| 2002/0046117 A1 | 4/2002 | Marion |
| 2002/0199054 A1 | 12/2002 | Akahane et al. |
| 2003/0167207 A1 | 9/2003 | Berardi et al. |
| 2004/0068472 A1 | 4/2004 | Sahota et al. |
| 2007/0051809 A1 * | 3/2007 | Takahashi et al. ........... 235/451 |

FOREIGN PATENT DOCUMENTS

| | | |
|---|---|---|
| JP | 2001-076117 | 3/2001 |
| WO | WO 92/16913 | 1/1992 |

* cited by examiner

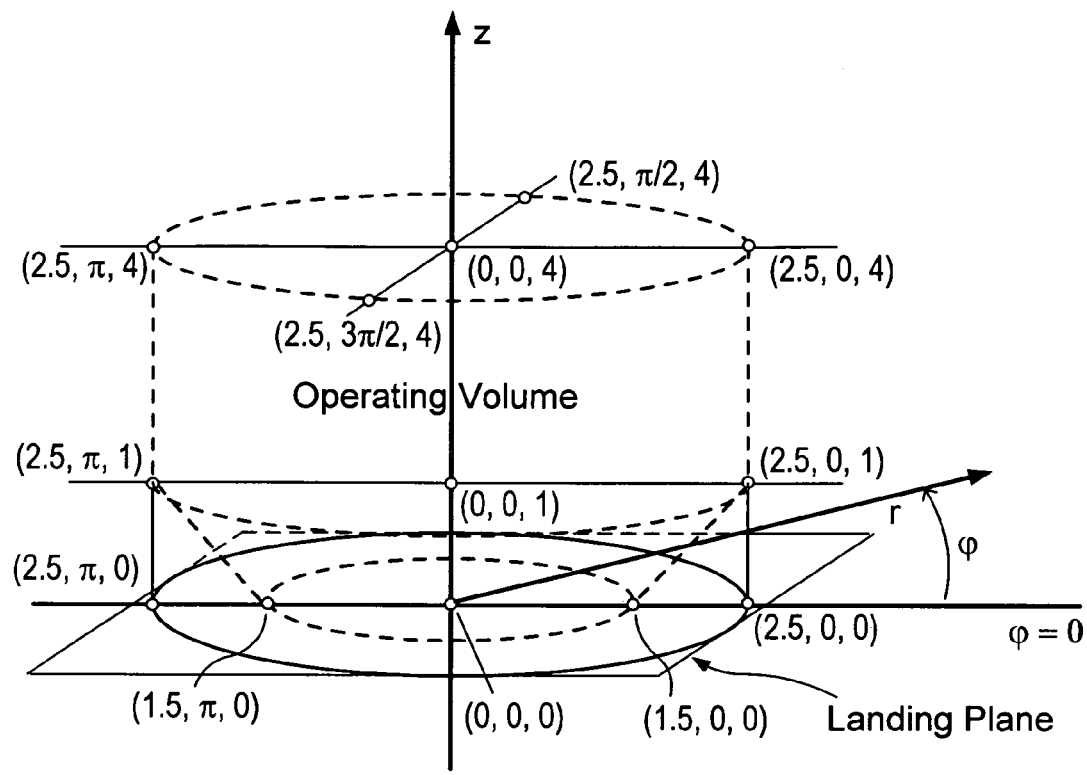
F I G. 1
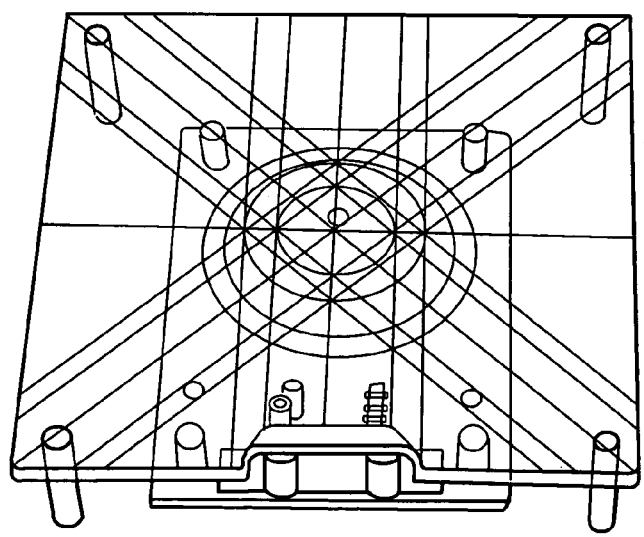
F I G. 2

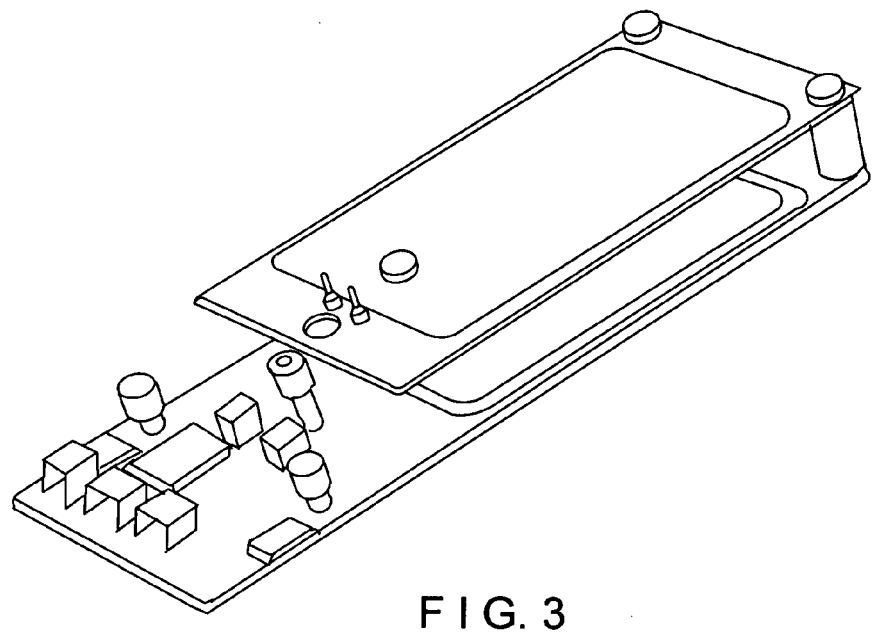
F I G. 3
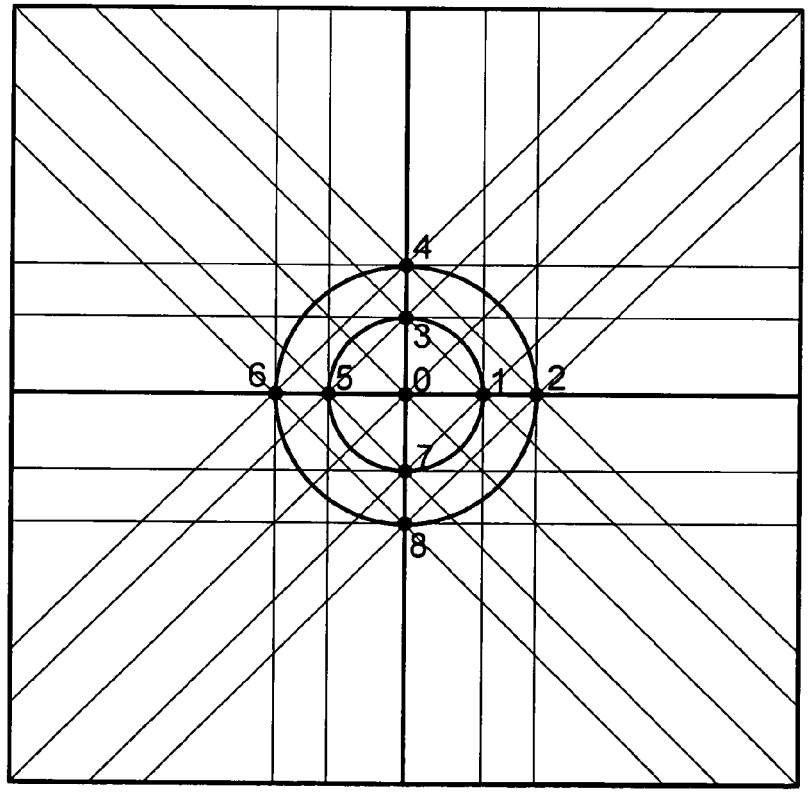
F I G. 4

CONTACTLESS PAYMENT CARD READER WITH A FRUSTO-CONICAL OPERATING VOLUME

CROSS-REFERENCE TO RELATED APPLICATIONS

This application claims the benefit of U.S. provisional patent application No. 60/588,270 filed on Jul. 15, 2004. This application is also related to U.S. patent applications Ser. No. 11/182,354, and Ser. No. 11/182,355, Ser. No. 11/182,357, and Ser. No. 11/182,358, co-filed on even date, all of which claim the benefit of the aforementioned patent application No. 60/588,270. All of the aforementioned patent applications are hereby incorporated by reference herein in their entireties

BACKGROUND OF THE INVENTION

Radio Frequency Identification (RFID) tags are small integrated circuits (ICs) connected to an antenna, which can respond to an interrogating RF signal with simple identifying information, or with more complex signals depending on the size of the IC. RFID technology does not require contact or line of sight for communication. Radio Frequency Identification (RFID) technology is now economically viable and is deployed in more and more commercial and industrial applications. For example, RFID technology is now widely used for tags on items in warehouses, shops, ID or access cards, etc. In addition, RFID technology has been introduced in the payment card industry (e.g., by MasterCard, American Express and Visa) in the form of "contactless" payment or credit cards embedded with RFID tags. These contactless payment cards can be used to make electronic payment transactions via radio communication with an RFID-enabled payment terminal. The contactless payment cards can provide consumers with simple, fast and convenient ways to pay for goods and services, for example, in retail establishments, stores or supermarkets.

Several RFID technologies are available for use in contactless payment cards and card readers/terminals. The basic components of a contactless system are the contactless reader (or Proximity Coupling Device (PCD)) and a transponder. The contactless reader is an antenna connected to an electronic circuit. A transponder consists of an inductive antenna and an integrated circuit connected to the ends of this antenna. The combination reader-transponder behaves as a transformer. An alternating current passes through a primary coil (reader antenna) that creates an electromagnetic field, which induces a current in the secondary coil (transponder antenna). The transponder converts the electromagnetic field (or RF field) transmitted by the contactless reader (PCD) into a DC voltage by means of a diode rectifier. This DC voltage powers up the transponder's internal circuits. The configuration and tuning of both antennas determines the coupling efficiency from one device to the other. The transponders may be the contactless payment cards.

For contactless payment card systems to be economically viable and to gain commercial acceptance, the contactless payment cards must be interoperable at all or most RFID-enabled payment terminals, even when the cards and terminals have technological features that are proprietary to specific card providers/issuers, vendors or terminal manufacturers. Industry-wide interoperability is desirable. Towards this end, industry standards organizations and groups (e.g., International Organization for Standards (ISO) and International Electro Technical Committee (IEC)) have formulated voluntary industry standards for implementation of contactless payment technologies. Three such exemplary standards which have been defined by ISO/IEC are the ISO/IEC 10536, ISO/IEC 14443, and ISO/IEC 15693 standards applicable to Close Coupling, Proximity and Vicinity cards, respectively.

The ISO/IEC 14443 proximity card standards (ISO 14443) have been used for several contactless card deployments worldwide. The targeted range of operations for ISO 14443 proximity cards is up to 10 cms, although this range varies depending on power requirements, memory size, CPU, and co-processor.

The ISO 14443 standards document has four distinct parts.

Part 1: Physical Characteristics, defines the physical dimensions for a Proximity Integrated Circuit Card (PICC). The card is the ID-1 size (85.6 mm×54.0 mm×0.76 mm). This is the same size as a bank credit card.

Part 2: Radio Frequency Power and Signal Interface, defines key technical characteristics of the contactless IC chips, including items such as frequency, data rate, modulation, and bit coding procedures. Two variations are detailed in Part 2, the Type A interface and the Type B interface. Both operate at the same frequency and use the same data rate, but they differ from one another in the areas of modulation and bit coding.

Part 3: Initialization and Anticollision. Initialization describes the requirements for proximity coupling device (PCD) (i.e., the reader) and the card to establish communication when the card is brought into the reader's radio frequency (RF) field. Anticollision defines what happens when multiple cards enter the magnetic field at the same time, identifying how the system determines which card to use in the transaction and ensuring that all cards presented are inventoried and processed.

Part 4: Transmission Protocols, defines the data format and data elements that enable communication during a transaction.

For a system of contactless payment cards and card readers to be compliant with ISO 14443, they must meet the requirements of at least some of parts of the voluntary standard. In addition to contactless technologies that are standardized under ISO 14443, a number of proprietary contactless interfaces are also used in the industry (e.g., Cubic's GO-Card and Sony's FeliCa card). With existing card technology deployments, interoperability can be an issue. Card readers deployed by vendors in the marketplace should preferably accommodate several different card types. For example, a desirable card reader would support ISO 14443 Type A and Type B cards, ISO 15693 cards and any additional proprietary card types.

Interoperability issues can arise even with card deployments that are presumably compliant with a single ISO standard (e.g., ISO 14443). In the ISO 14443 standard, all requirements or specifications related to RF Power and signal interfaces in the contactless card and reader system (i.e., the physical layer in an Open System Interconnection (OSI) model view of the system) are defined using separate standardized tests for cards and for readers. The ISO/IEC 10373 Standard Part 6 (ISO 10373-6) deals with test methods, which are specific to contactless integrated circuit card technology (proximity card). Compliance of contactless cards and readers to ISO 14443 is verified using reference devices. According to ISO 10373-6, a set of "reference" cards (i.e., Reference PICC), which represent the characteristics of contactless cards, is used for measuring specification compliance of a contactless reader. (See, e.g., FIG. 1a). For example, the Reference PICC is used to test the magnetic field produced or transmitted by a PCD, and to test the ability of the PCD to power a PICC. Similarly, a "reference" reader (i.e., a Test or Reference PCD), which may represent the characteristics of a typical contactless reader, is used for measuring specification compliance of contactless cards. For example, the Reference PCD in conjunction with a pair of external sense coils is used to test the load modulation that is generated by cards during testing.

While the separate card and reader compliance test procedures under ISO 10373-6 may ensure that deployed product devices individually have characteristics that fall in either the designated specification ranges for cards or readers, the procedures do not ensure interoperability in the field. Cards and/or readers verified as compliant may be only marginally so (e.g., by having a characteristic value at the end or edge of a designated specification range). This manner of standards compliance can lead to operational failure in the field. For example, a marginally compliant card may be unreadable or difficult to read using a card reader that is also only marginally compliant.

Further, with respect to verifying important data transmission and reception functions of contactless devices, ISO 10373-6 makes provisions for only indirect measurements of the load modulated data signals generated by cards. A PCD Test Assembly prescribed by ISO 10373-6 for testing product cards has a pair of sense coils that are external to the reference PCD reader. These external sense coils are utilized to measure the load modulated data signal generated and transmitted by card under test. However, there is no direct or obvious relation between the load modulated signal measured by the sense coils and the signal that is physically received by the reference PCD antenna. Therefore, testing of data transmission functions of a product card using the external sense coils does provide direct assurance that a putatively ISO compliant product card's modulation of data signals is sufficient or compatible with a product reader's ability to receive or process the modulated data signals properly.

U.S. patent applications Ser. No. 11/182,354, Ser. No. 11/182,355, Ser. No. 11/182,357, and Ser. No. 11/182,358, disclose solutions for enhancing device interoperability based on improvements in specification definitions, reference equipment and compliance testing related to the RF power and signal interface between interacting card and reader devices.

Consideration is now being given to further ways of enhancing interoperability of the electronic payment devices and also to making the operation the contactless electronic payment systems robust and failure proof. Attention is now directed to aspects of electronic payment systems related to the physical characteristics and dimensions of contactless payment devices.

SUMMARY OF THE INVENTION

A contactless card reader has a "frusto-conical" operating volume, which is shaped as a cylinder that tapers into a frusto cone. An RF antenna circuit generates electromagnetic RF operating fields for powering and communicating with payment cards disposed in the frusto-conical operating volume. The RF Antenna, which is tuned to about 13.56 MHz, is placed about 15 cms below a cover plate, which serves as a landing plane of the reader. The smaller diameter base of the frusto-conical operating volume rests on the landing plane. The operating RF fields (i.e. near field magnetic fields $H_{OV}$) generated by the RF antenna in the frusto-conical shaped operating volume are specified to power and communicate with contactless payment cards of different origin that may be placed in the frusto-conical shaped operating volume.

In a version of the reader, the RF antenna has a diameter of about 7 cms, and is positioned at a fixed distance of about 15 cms below the landing plane. The frusto-cone portion of the frusto-conical operating volume has an axial length of about 1 cm, a small base diameter of about 1 cm and a large base diameter of about 3 cms. The cylindrical portion of the frusto-conical operating volume cylinder portion has a diameter of about 3 cms and an axial length of about 5 cms, respectively.

The reader with the frusto-conical operating volume can be configured as a reference reader whose external behavior is representative of the behaviors of the several readers deployed in an electronic payment system. The RF antenna circuit is configured to generate a magnetic field $H_{OV}$ in a frusto-conical shaped operating volume that is representative of the operating volume magnetic fields of the several readers deployed in the electronic payment system. The reference reader may be used in a test procedure to characterize the functional or operating behavior of payment cards. In a test procedure, the data reception and power sensitivity of the product card placed in the frusto-conical operating volume are measured. The payment card under test is placed in different orientations and at different position in the frusto-conical operating volume to simulate field use of the cards.

Further features of the invention, its nature and various advantages will be more apparent from the accompanying drawings and the following detailed description.

BRIEF DESCRIPTION OF THE DRAWINGS

FIG. 1 is an illustration of a frusto-conical geometry of the minimum operating volume of an exemplary reader designed in accordance with the principles of the present invention.

FIG. 2 is a picture of an exemplary PayPass—Reference reader designed in accordance with the principles of the present invention.

FIG. 3 is a picture of an exemplary PayPass—Reference card designed in accordance with the principles of the present invention.

FIG. 4 is an illustration of a cover plate which serves as a landing plane for the PayPass—Reference reader of FIG. 2

DETAILED DESCRIPTION OF THE INVENTION

Figure 5:
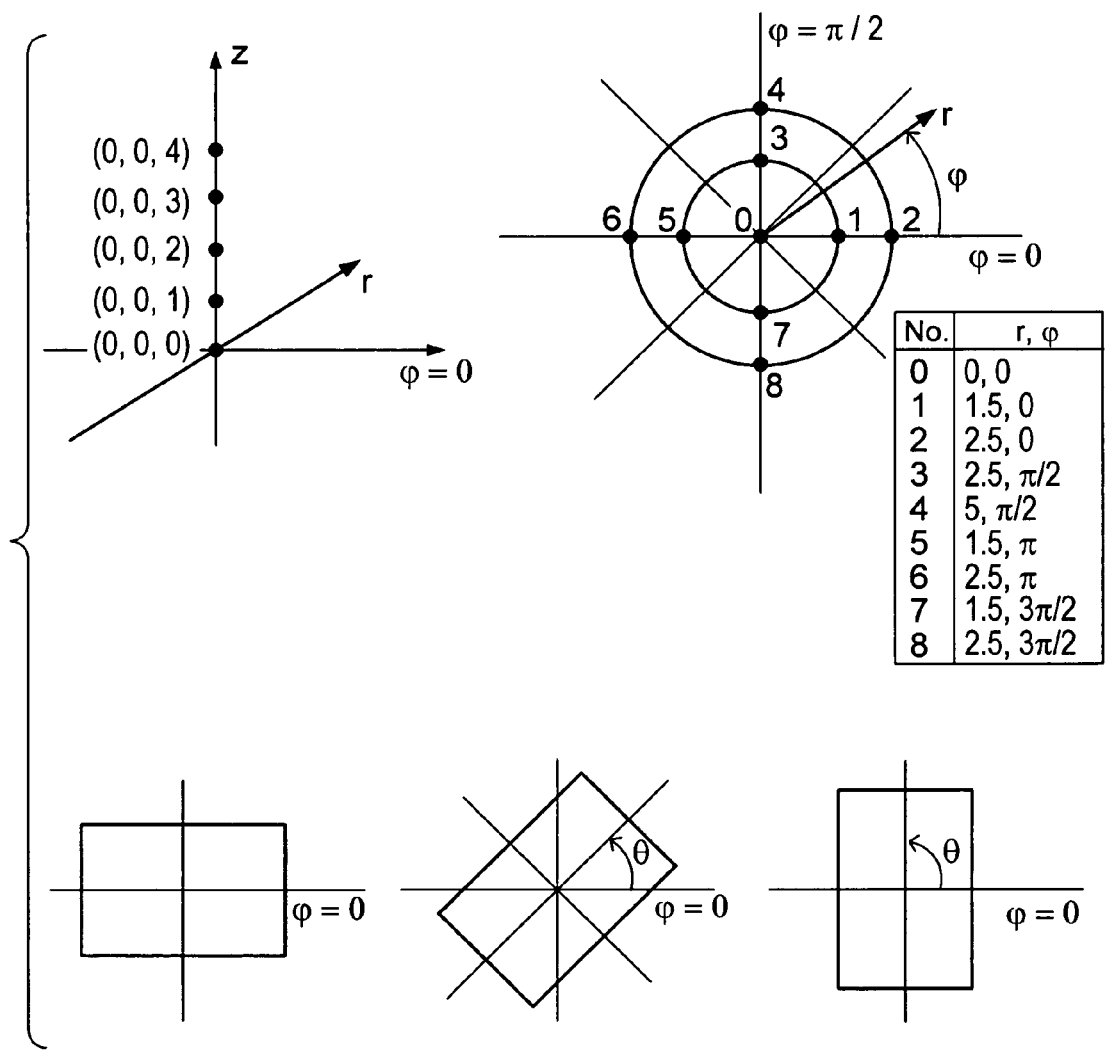
FIG. 5 is an illustration of a set of geometrical positions at which a subject payment card is placed in the frusto-conical operating volume of the PayPass—Reference reader to simulate field use of the payment card in a card testing procedure in accordance with the principles of the present invention.

The present invention provides a card reader arrangement having a frusto-conical shaped operating volume. The frusto-conical shaped operating volume has defined magnetic field strengths that are suitable for robust and consistent interactions with proximity payment cards presented or placed in the operating volume. FIG. 1 shows an example of a frusto-conical operating volume definition for a reader.

The reader arrangement can be used as a reference device for testing specification compliance of product payment cards. As an example, the PayPass—Reference reader (FIG. 2), which is described in U.S. patent application Ser. No. 11/182,357, may be designed to have a frusto-conical shaped operating volume for evaluating or observing payment card behaviors and performance.

The inventive reader arrangement is described herein in the exemplary context of implementations of electronic payment systems in which the contactless payment device specifications are intended to conform to a common industry standard such as the ISO 14443 Standard, which further specifies standardized test methods (i.e., ISO 10373-6 Test Methods, Proximity Cards) for verification of the specification of individual contactless payment devices. Recently, assignee MasterCard International Incorporated ("MasterCard") has developed proprietary specifications MasterCard PayPass™ ISO/IEC 14443 Implementation Specification ("PayPass") for implementation of proximity payment card technologies (e.g., by issuers, vendors or manufacturers of cards and card readers). The PayPass implementation is consistent with the ISO 14443 Standard and provides a convenient example illustrating the principles of the present invention. It will be understood that the selection of the PayPass implementation for purposes of illustration herein is only exemplary, and that the principles of the present invention can be more generally applied to electronic payment devices and systems that operate under other common industry or proprietary standards.

With reference to FIG. 2, the PayPass—Reference reader includes an RF antenna 200, which is designed to resonate at 13.56 MHz. The reader antenna 200 is printed on a circuit board 210 that is placed at a fixed distance below a cover plate 400 (FIG. 4). Cover plate 400 may serve as a landing plane i.e. a reader surface, on which a cardholder may tap or place his or her payment card for processing. In field use, cover plate 400 may have suitable guide markings or logos, which can visually direct a cardholder to selected positions for tapping or placing his or her payment card for transaction processing.

The landing plane defines the base of the inverted frusto-conical operating volume with the axis of the frusto-conical operating volume lying generally normal to the landing plane surface. The reader antenna has a circular shape, and generates magnetic fields that are generally cylindrically symmetrical around the normal to the landing plane. The size and the windings of the reader antenna may be suitably designed using known RF antenna design principles to generate operating magnetic fields ($H_{OV}$) at 13.56 MHz for activating and communicating with proximity payment card devices. The $H_{OV}$ strengths are in a specified range at least within the inverted frusto-conical operating volume. The specified range is selected keeping in mind that the payment cards deployed in the field, which may be manufactured by various card issuers or vendors to varying specifications, can exhibit a range of behaviors. For example, the inductive coupling antennas or RFID tags in the proximity cards issued by different vendors may have different size and shape. The specified range of magnetic field strengths in the frusto-conical operating volume is selected to provide adequate power to activate and communicate with a range of interacting payment cards of different origin and behaviors.

The frusto-conical operating volume is defined by geometrical parameters (e.g., base diameters D1 and D2, and cone axial length S1 and cylindrical axial length S2), which are shown in FIG. 1). Table I lists nominal values of these parameters selected for an exemplary definition of the frusto-conical operating volume for the PayPass—Reference reader of FIG. 2.

TABLE 1

| Operating Volume dimensions | D1 | 3 cms |
|---|---|---|
| | D2 | 5 cms |
| | S1 | 1 cm |
| | S2 | 3 cms |

In the exemplary PayPass—Reference reader, the reader antenna has a diameter of about 7 cms and is positioned at about 15 cms below the landing plane. The antenna has dual active and dummy windings, which when supplied with electrical currents, provide at least a minimum field strength $H_{min}$ required to power and communicate with a payment card that is positioned within the specified frusto-conical operating volume. At the same time, the operating magnetic fields ($H_{OV}$) generated by the antenna are constrained to remain below a certain maximum strength $H_{max}$. The value of $H_{max}$ is suitably selected to limit power dissipation in the payment cards to below commonly accepted thresholds to avoid device damage. Also, the magnetic field strengths both inside and outside the operating volume are limited to comply with all international and national regulations and laws concerning safe use and exposure limits for such radiation.

The operating volume of the exemplary PayPass—Reference reader may be characterized or calibrated using a suitable reference card, for example, a PayPass—Reference Card (FIG. 3), which is also described in co-pending U.S. patent application Ser. No. 11/182,357. The strength of the operating magnetic fields ($H_{OV}$) in the frusto-conical operating volume may be specified or measured in equivalent terms of the required power transfer (voltage $V_{OV}$) from the reader to a payment card.

Table II shows a specification for the minimum and maximum values for the power transfer voltages $V_{OV}$ in the frusto-conical operating volume of the PayPass—Reference reader. The electromagnetic coupling (i.e. mutual inductance) between card and reader antennas perturbs the operating magnetic fields when a card is brought into the operating volume. In particular, the magnetic field strength within the operating volume decreases due to the extra load caused by the card. The $V_{OV}$ values for the reader and card may be measured at suitable definition points in reference reader and reference card antenna circuits, respectively. The loading of a card can be measured by observing a circuit voltage drop $\Delta V_{OV}$ ($V_{OV,FREE\ AIR} - V_{OV,card}$) at a suitable point in the PayPass—Reference reader antenna circuit. Table II also shows a maximum acceptable value of $\Delta V_{OV}$ corresponding to a nominal card load.

TABLE II

| Topic | Parameter | PCD Min | Nom. | Max | PICC Min | Nom | Max | Units |
|---|---|---|---|---|---|---|---|---|
| Power Transfer | $V_{OV}$ | 3 − α z | | 8.5 | 2.8 − α z | | 8.7 | V |
| | α | 0.35 | | | 0.35 | | | V/cm |
| PCD→PICC | $\Delta V_{OV,MAX}$ | | | | | | 0.8 | V |

The inventive reader arrangement (e.g., the PayPass—Reference reader) having the defined frusto-conical operating volume may be used in conjunction with the systems and methods disclosed in co-pending U.S. patent application Ser. No. 11/182,354 for testing product payment cards, for example, for verification of specification compliance. An exemplary procedure for verifying specification compliance of a product card, may involve the following steps:

(a) measuring the data transmission by the product card on the PayPass—Reference reader, with the reader sending "average" value commands to the product card and with the PayPass—Reference reader providing an "average" power level. Both the power level and the command characteristics produced by the PayPass—Reference reader are calibrated with respect to a Reference card, and (b) measuring the data reception and power sensitivity of the product card under test using the PayPass—Reference reader.

In operation, a ±600 mW signal may be fed into the reader antenna's 50 Ω input impedance to generate a magnetic field, which is representative of most PayPass readers deployed in the field. The product cards may be characterized under conditions that simulate card use conditions in the field. For example, a product card's behavior may be characterized or measured at different distances from and at different orientations relative to the reader antenna. In an exemplary test routine, the reader is held in stationary position and the subject product card is moved slowly through the operating volume from one test position to the next for measurements. FIG. 5 shows a set of such test positions used in the exemplary test routine. The set of test positions is distributed through the 3-dimensional space of the frusto-conical operating volume. The test positions are shown as quadruplet co-ordinates (r, φ, z, and θ) in FIG. 5, where polar co-ordinates r, φ, and z represent the center of the subject product card under test. With reference to FIG. 1, (r, φ, z)=(0, 0, 0) represents the center of the landing plane. In the exemplary test routine, all measurements on subject product card are conducted with the card held perpendicular to the Z-axis. Co-ordinate z represents the height of the payment card form the landing plane. Co-ordinate θ represents the orientation of the card relative to the φ=0 axis.

While the present invention has been particularly described with reference to exemplary embodiments thereof, it will be understood by those skilled in the art that various modifications and alterations may be made without departing from the spirit and scope of the invention. Accordingly, the disclosed embodiments of the invention are considered merely illustrative, and the invention is limited in scope only as specified in the appended claims.

We claim:

1. A reader arrangement for reading contactless payment cards, the reader comprising:

an RF antenna circuit; and a landing plane positioned at a fixed distance from the RF antenna, wherein the RF antenna circuit is configured to generate a magnetic field $H_{ov}$ in a frusto-conical shaped operating volume, wherein the landing plane forms the smaller diameter base of the frusto-conical shaped operating volume, wherein the magnetic field $H_{ov}$ in the frusto-conical shaped operating volume is specified to power and communicate with the contactless payment cards placed in the frusto-conical shaped operating volume, wherein the frusto-conical shaped operating volume comprises:

a frusto cone having an axial length S1, a small base diameter D1 and a large base diameter D2; and a cylindrical section having a diameter D2 and an axial length S2, wherein the RF antenna has a diameter of about 7 cms, wherein the landing plane is positioned at a fixed distance of about 15 cms from the RF antenna, and wherein the parameters S1, S2, D1 and D2 have nominal values of about 1, 3, 3 and 5 cms, respectively.

2. The reader arrangement of claim 1 wherein the magnetic field Hov corresponds to a power transfer voltage Vov measured at a point on the RF antenna circuit, and wherein Vov measured on the RF antenna circuit has a nominal value of about 3-αz volts on an RF antenna circuit where z is the distance of a payment card from the landing plane in cms and where a is equal to about 0.35.

3. A reference reader for testing a contactless payment card that can be used with any of several card readers deployed in an electronic payment system, the reference reader comprising:

an RF antenna circuit whose external behavior is representative of the behaviors of the several readers deployed in the electronic payment system, wherein the RF antenna circuit is configured to exhibit the representative external behavior to the contactless payment card under test and to generate a magnetic field $H_{ov}$ in a frusto-conical shaped operating volume, and wherein the magnetic field $H_{ov}$ in the frusto-conical shaped operating volume is specified to power and communicate with the contactless payment card placed in the frusto-conical shaped operating volume.

4. The reference card of claim 3 wherein the several readers are contactless payment card readers and wherein the RF antenna circuit comprises an antenna having a resonant frequency of about 13.56 MHz.

5. The reference reader of claim 4 wherein the RF antenna is a circular antenna fabricated on a circuit board, and wherein the reference reader further comprises a landing plate on which cards are placed for testing and which is disposed at a fixed distance of about 15 cms away from the printed circuit board.

6. The reference reader of claim 5 wherein the antenna is a circular antenna having a diameter of about 7 cms which represents an average of the antenna sizes of the several readers deployed in the field and which generates a magnetic field which is representative of readers deployed in the field.

7. The reference reader of claim 6 wherein the frusto-conical shaped operating volume comprises:

a frusto cone having an axial length S1, a small base diameter D1 and a large base diameter D2; and a cylindrical section having a diameter D2 and a length S2.

8. The reference reader of claim 7 wherein the landing plane is positioned at a fixed distance of about 15 cms from the RF antenna, and wherein the parameters S1, S2, D1 and D2 have nominal values of about 1, 3, 3 and 5 cms, respectively.

9. The reference reader of claim 8 wherein the magnetic field Hov corresponds to an equivalent power transfer voltage Vov measured at a point on the RF antenna circuit, and wherein the Vov measured on the RF antenna circuit has a nominal value of about (3-αz) volts, where z is the distance of the payment card from the landing plane in cms and where α is equal to about 0.35.

10. A method for testing the behavior of a contactless payment card that can be used with any of several card readers deployed in an electronic payment system, the method comprising the steps of:

providing a reference reader having a frusto-conical operating volume, the reference reader comprising an RF antenna circuit whose external behavior is representative of the behaviors of the several readers deployed in the electronic payment system, wherein the RF antenna circuit is configured to exhibit the representative external behavior to the payment card under test and to generate a magnetic field $H_{ov}$ in the frusto-conical shaped operating volume, and wherein the magnetic field $H_{ov}$ in the frusto-conical shaped operating volume is specified to power and communicate with the contactless payment card when placed in the frusto-conical shaped operating volume;

placing the contactless payment card at a first position in the frusto-conical shaped operating volume; and measuring the data reception and power sensitivity of the contactless card placed in the operating volume.

11. The method of claim 10 further comprising:

placing the contactless payment card at a set of positions in the frusto-conical shaped operating volume; and measuring the data reception and power sensitivity of the product card at each of set of positions in the frusto-conical shaped operating volume.

* * * * *